United States Patent [19]

Minnick et al.

[11] 4,259,271

[45] * Mar. 31, 1981

[54] METHOD OF MAKING SHOT FROM MOLTEN SILICEOUS-ALUMINOUS COMPOSITION

[76] Inventors: L. John Minnick, 306 Boyer Rd., Cheltenham, Pa. 19012; William C. Webster, 3008 Potshop Rd., Norristown, Pa. 19401; Charles L. Smith, 34 Corson Rd., Conshohocken, Pa. 19428

[*] Notice: The portion of the term of this patent subsequent to May 8, 1996, has been disclaimed.

[21] Appl. No.: 36,156

[22] Filed: May 4, 1979

Related U.S. Application Data

[63] Continuation-in-part of Ser. No. 708,200, Jul. 23, 1976, Pat. No. 4,153,655.

[51] Int. Cl.$^3$ ............................................. B01J 2/02
[52] U.S. Cl. ............................................................ 264/8
[58] Field of Search ............................................ 264/8

[56] References Cited

U.S. PATENT DOCUMENTS

| | | | |
|---|---|---|---|
| 2,257,878 | 10/1941 | Bennan | 264/5 |
| 3,887,667 | 6/1975 | Clark | 264/8 |
| 3,896,203 | 7/1975 | Maringer | 264/8 |

*Primary Examiner*—Donald E. Czaja
*Assistant Examiner*—James R. Hall
*Attorney, Agent, or Firm*—Paul F. Prestia

[57] ABSTRACT

Improved method for making generally spherical particulate shot-like product comprising permitting a siliceous-aluminous composition of specified characteristics onto a rotating squirrel cage rotor near top dead center thereof and causing said impinging molten material to be projected in droplet form and cooled while suspended in a gaseous cooling medium, such as air, into an amorphous generally spherical product, suitable for use as an abrasive or filler material.

8 Claims, No Drawings

METHOD OF MAKING SHOT FROM MOLTEN SILICEOUS-ALUMINOUS COMPOSITION

This is a continuation in part of U.S. patent application Ser. No. 708,200 filed July 23, 1976, which will issue as U.S. Pat. No. 4,153,655 on May 8, 1979, the specification of which is incorporated herein by reference.

The parent application discloses a method of making shot from molten fly ash, in which other material may also be included, by permitting the molten material to drop and impinge upon a rotor of the type used in squirrel cage fans and motors. The molten product is then projected by the rotating device and cools in the course of its travel into an amorphous particulate product, in which the particles are generally spherical.

In accordance with the present invention, this concept has been enlarged to utilize this process for the making of shot from other starting materials. In general, for a composition to be utilizable in the process of the present invention, it must, of course, be molten and have sufficient heat to drop from a container and strike the rotating member, be dispersed in air while still sufficiently molten and then have sufficient surface tension to be pulled into spherical shape. It must also be capable of hardening, upon rapid cooling while suspended in a gaseous cooling medium such as air, into an amorphous mass.

Metals, for example, to the extent they have been tested do not meet the foregoing characteristics. However, other materials similar to fly ash in these characteristics, namely siliceous, aluminous compositions in general, are adapted to use in the present invention.

For any such specific material, of course, the apparatus and process must be "tuned" to achieve the rapid particle spherical shape formation and hardening during travel after impingement upon the rotor.

The preferred apparatus for use in the process of the present invention is the blower or squirrel cage from a squirrel cage fan. Such rotors ranging from 3 to 11 inches in diameter have been successfully tested in the process of the present invention with fly ash.

Specifically, this device consists of a rotating mechanical member consisting of a plurality of horizontally disposed elements suspended between two circumferential supports in parallel vertical planes, the supports having central bearing sleeves surrounding a horizontal axis about which the member rotates.

The obvious variables in the operation of this apparatus include the rotation speed, the dropped distance of the molten material prior to impingement, the temperature, density, heat transfer characteristics, viscosity and surface tension of the molten material at impingement and thereafter, the cooling characteristics of the material after impingement and heat transfer characteristics of the gaseous cooling medium in which the spherical particles are formed upon projection from the rotating device. All such variables must, of course, be specifically determined experimentally for optimization of the process with a particular apparatus and composition.

Further, with respect to variables which must be experimentally determined and optimized for each application in the present process, the effect of temperature of the molten ash to be "pelletized" is critical to the successful functioning of the apparatus. While rate of heat loss from the molten material can be affected by temperature of the mass, several of the specific operational configuration variables have significantly greater effect.

For example, the dropped distance of the molten material prior to impingement is directly related to the amount of heat loss during dropping and may result in more rapid cooling after impingement.

Similarly, the point of impact is significant. In general, this point of impact is in the 45° segment bounded by top dead center and extending away therefrom in the direction of rotation of the rotor device. This controls the length of time that finely divided fractions are suspended in the gaseous cooling medium (ordinarily air) and therefore the time during which they must assume the desired spherical form and cooled into a hardened amorphous mass. Generally, slightly greater travel times are obtained as the impingement point approaches top dead center.

It may also be possible to utilize an impingement point just ahead of top dead center.

With respect to the rotational velocity of the rotor, higher rotational speeds tend to reduce the molten mass droplet size and result in a finer product. Thus, it may be possible to produce a product of variable particle size by variation of the rotor speed. The length of the cooling chamber through which the particles are projected for cooling must, of course, be tailored to the particular material, their length of travel depending upon particle size and rotational velocity of rotor and must be sufficient to permit the droplets to form into a hardened product while suspended in the gaseous cooling medium so as to avoid a deformation upon impact with the collection chamber wall.

Briefly, the present invention comprises a process of the type heretofore described with respect to other process variables, as utilized to make a shot-like product from a variety of compositions, namely siliceous-aluminous composition of the type normally found in glass, wet bottom boiler slag, coal conversion slag, steel-making slag, iron-making slag, non-ferrous metal slag and so forth. Each of these compositions have sufficient surface tension in molten particles thereof to assume spherical shape upon rapid cooling when said particles are suspended in a gaseous cooling medium. Moreover, each of these compositions has a tendency to harden into an amorphous state upon rapid cooling. These characteristics are necessary to the utilization of such compositions in the process of the present invention. Other siliceous-aluminous compositions having these characteristics may also be utilized in the method of the present invention.

By way of further description of some of the specific compositions utilizable in the present invention, wet bottom boiler slag is that slag produced in pulverized coal boilers of either the wet or dry bottom furnace type. In dry bottom furnaces, the bottom of the furnace resembles a large hopper, and particles of coal ash that are too heavy to be transported with a flue gas (bottom ash) settle into the hopper where they are cooled in a water bath and are sluiced to a storage or disposal area. Wet bottom boilers are designed for coal ash having a relatively low fusion point. In these boilers, molten ash (boiler slag) is typically discharged continuously through a small hole in the furnace floor into a water-filled tank, from which the slag is sluiced to a storage or disposal area. Cyclone furnaces are always wet bottom furnaces, and they produce relatively large proportions of molten slag.

Coal conversion slag is that waste product produced in coal conversion processes involving indirect combustion of coal. Two major process types are currently in the pilot plant stage of development. These are coal liquefaction processes, typified by the solvent refined coal process in which coal is hydrogenated with hydrogen to produce a liquid or solid product and a siliceous-aluminous waste stream, referred to herein as a coal conversion slag. Another coal conversion process is coal gassification in which coal is contacted with steam and oxygen, producing a molten slag by-product. Similar more well known compositions utilizable in the present invention include those slags produced in iron and steel making and in non-ferrous metal refining, and also include glass itself. Each of these compositions is a siliceous-aluminous product having the necessary characteristics for use in the present invention.

The essentially spherical particulate product of the present invention may find use as abrasives for metal cleaning and metal peining applications and as filler or aggregate materials. In the abrasives category, the particle shape produced in the present invention (essentially spherical) offers advantages over many of the competitive materials (sub-angular particles), in that cleaning can be accomplished with less wear on the metal surface. This provides longer life for the metal, and in some cases, may reduce disposal problems with the spent abrasive material. As a filler or aggregate material, the spherical pellets produced in the process of the present invention can be used either as an extender simply to take up space (as in PVC or other plastic compositions) or as a portion of a mix where its physical or chemical properties contribute to the performance of the overall mix. Examples of this latter use are grouting, mortar, and concrete mixes (wherein the spherical particle shape may contribute to workability and strength as a result of chemical reaction with the matrix), cementitious road base compositions (wherein strength may be contributed as a result of chemical reaction). Many other uses for the product of the present invention may also be envisioned. In any event, it is evident that with the present invention, a wide variety of materials, many of which are otherwise wasted, are convertible into a useful product. Typically, compositions useful in the present invention also include an alkali, alkaline earth metal or iron oxide compound which functions inter alia, as fluxes for the compositions rendering them more suitable for use in the present invention.

Having described the invention, we claim:

1. Method of making a finely divided generally spherical product from a siliceous-aluminous composition having sufficient surface tension in molten particles thereof to assume spherical shape upon rapid cooling when said particles are suspended in a gaseous cooling medium, said composition also being characteristically hardenable into an amorphous state upon rapid cooling, said method consisting of:

forming a melt of said composition, said molten composition adapted by surface tension therein to form, from particles thereof, essentially spherical shapes upon rapid cooling;

pouring said melt onto a rotating mechanical member consisting of a plurality of horizontally disposed elements suspended between two circumferential supports in parallel vertical planes, the supports having a central bearing sleeve surrounding a horizontal axis about which the member rotates, said melt impinging upon the horizontal elements of said rotating mechanical member at a point in a 45° sector thereof bounded by top dead center and extending away from that point in the local direction of travel of said member at top dead center, the conditions of said pouring and said impinging being adapted to cause said molten composition to be thrown off in finely divided form in the direction of travel of said rotating member; and said conditions also being adapted to permit rapid cooling and hardening of said finely divided molten composition in amorphous, essentially spherical, particulate form in the course of travel thereof through the air space surrounding said member.

2. Method, as recited in claim 1, wherein said siliceous-aluminous composition is selected from the group consisting of glass, wet bottom boiler slag, coal conversion slag, steel-making slag, iron-making slag, and non-ferrous metal refining slag.

3. Method, as recited in claim 1, wherein said siliceous-aluminous composition is glass.

4. Method, as recited in claim 1, wherein said siliceous-aluminous composition is wet bottom boiler slag.

5. Method, as recited in claim 1, wherein said siliceous-aluminous composition is coal conversion slag.

6. Method, as recited in claim 1, wherein said siliceous-aluminous composition is steel-making slag.

7. Method, as recited in claim 1, wherein said siliceous-aluminous composition is iron-making slag.

8. Method, as recited in claim 1, wherein said siliceous-aluminous composition is non-ferrous metal refining slag.

* * * * *